United States Patent Office 3,086,997
Patented Apr. 23, 1963

3,086,997
SYNTHESIS OF 2-MERCAPTOETHANOL
Paul F. Warner, Phillips, Tex., assignor to Phillips
Petroleum Company, a corporation of Delaware
No Drawing. Filed Nov. 7, 1961, Ser. No. 150,632
3 Claims. (Cl. 260—609)

This invention relates to a novel synthesis of 2-mercaptoethanol. In one of its aspects the invention relates to the synthesis of 2-mercaptoethanol by first inter-reacting sodium hydroxide and hydrogen sulfide to form sodium hydrosulfide and then inter-reacting the reaction mass with ethylene oxide and then neutralizing the final reaction mass thus obtained.

2-mercaptoethanol, which is valuable as a mercaptan and also as an alcohol, and which can be used in the preparation of water soluble di- and polysulfides, has been prepared, according to the present invention, by reactions which can be illustrated by the following:

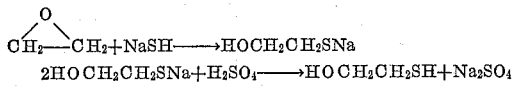

$$2HOCH_2CH_2SNa + H_2SO_4 \longrightarrow HOCH_2CH_2SH + Na_2SO_4$$

By proceeding according to the foregoing reactions it is possible to obtain the 2-mercaptoethanol without the formation of thiodiglycol.

Thus in one process known to me 2-mercaptoethanol and thiodiglycol are obtained by reaction of ethylene oxide and hydrogen sulfide. This can be illustrated by the following reactions.

(1)

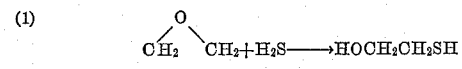

(2)

$$HOCH_2CH_2SH + CH_2 \overset{O}{\diagdown} CH_2 \longrightarrow HOCH_2CH_2SCH_2CH_2OH$$

It is an object of this invention to provide a novel synthesis for 2-mercaptoethanol. It is a further object of this invention to provide a method for producing 2-mercaptoethanol without the formation of thiodiglycol.

Other aspects, objects and the several advantages of this invention are apparent from a study of this disclosure and the appended claims.

According to the present invention there is provided a process for the synthesis of 2-mercaptoethanol which comprises inter-reacting sodium hydrosulfide and ethylene oxide at an elevated temperature, and after completion of the reaction thus obtained, neutralizing the reaction mass and recovering 2-mercaptoethanol from the neutralized mass thus obtained. In a now preferred form of the invention sodium hydroxide and water are charged to a reactor. Then hydrogen sulfide is added to convert the sodium hydroxide to hydrosulfide. The mixture thus obtained is heated to approximately 150° F. Ethylene oxide is then added over a period of a few minutes. The reaction temperature and pressure are allowed to rise and after a few minutes, for completion of the reaction, the reaction product is neutralized with sulfuric acid to a pH of 3, obtaining two phases, namely an organic phase and a water phase.

On separating the phases and distilling the organic phase a distillation end point of 328° F. can be obtained showing that no thiodiglycol has been formed. Thiodiglycol boils at 540° F.

It will be evident to one skilled in the art reading this disclosure that other alkali metal hydroxides can be used and that neutralization can be effected with other acids.

*Example I*

A run was made in a 1-liter stainless-steel reactor. Sodium hydroxide (100 g.) and water (400 g.) were charged to the reactor. Then $H_2S$ was added until the hydroxide was all converted to hydrosulfide. This mixture was then heated to 150° F., and ethylene oxide (110 g.) was added over a period of 7 minutes. The reaction temperature rose to 125° F. and the pressure to 40 p.s.i.g. After allowing a few minutes to complete the reaction, the reactor product was neutralized with sulfuric acid (80 ml., 98 percent) to a pH of 3. Two phases were present:

| | Grams |
|---|---|
| Organic phase | 287 |
| Water phase | 446 |

These were separated and an ASTM distillation on the organic phase showed that it contained approximately 50 percent water and 50 percent of material boiling above 250° F. The distillation end point was 328° F. showing that no thiodiglycol was formed (boiling point 540° F.).

*Example II*

A stainless-steel autoclave with a 1-quart capacity was used. Charge data on the run are as follows:

Charge:

| | g. | Moles |
|---|---|---|
| NaOH (20 percent) | 500 | 2.5 |
| $H_2S$ | 85 | 2.5 |
| $CH_2\text{—}CH_2\text{—}O$ | 110 | 2.5 |

Conditions:
Temperature, °F. _____ 156–225.
Pressure, p.s.i.g. _____ 25–45.
Reaction, time, min.[1] _____ 7.
Product Data:
$H_2SO_4$ (concentrated) added _____ 80.
pH _____ 3.
No. 1 organic phase, g. _____ 287.
No. 1 water phase, g. _____ 446.
Distillation of No. 1 organic phase _____ ASTM D-86, °F. at 760.
  I.B.P. (209) ⎫
  5 (211)     ⎬ No. 2 water phase.
  10 (211)    ⎪
  40 (213)    ⎭
  50 (267)    ⎫
  60 (281)    ⎪
  70 (301)    ⎪
  80 (303)    ⎬ No. 2 organic phase.
  90 (324)    ⎪
  95          ⎪
  DP          ⎪
  EP (328)    ⎭
Yield, estimated from ASTM distillation
  of No. 1 organic phase _____ 144 g.
  Theoretical yield _____ 195 g.

[1] Required to add the ethylene oxide.

It will be noted that in the foregoing examples there is a complete absence of heavy ends in the ASTM distillation. This shows that thiodiglycol, the boiling point of which, as stated, is 540° F., was not formed.

When the alkali metal hydrosulfide and ethylene oxide are reacted the temperature is elevated. One skilled in the art having studied this disclosure will determine a desirable temperature. However, the results which have been obtained and which have been set out herein can be obtained by adding ethylene oxide to the sodium hydrosulfide-containing mass at a temperature in the range of 125 to 250° F.

Reasonable variation and modification are possible within the scope of the foregoing disclosure and the appended claims to the invention the essence of which is that 2-mercaptoethanol has been prepared without the formation of thiodiglycol by inter-reacting sodium hydrosulfide and ethylene oxide and then converting the reaction mass thus obtained by neutralizing the same with sulfuric acid, ultimately obtaining from the final reaction mass the 2-mercaptoethanol.

I claim:
1. A method of preparing 2-mercaptoethanol which comprises interreacting sodium hydrosulfide and ethylene oxide and then neutralizing the reaction mass thus obtained.
2. A process of preparing 2-mercaptoethanol which comprises interreacting sodium hydrosulfide and ethylene oxide at a temperature in the range 125–250° F. and then neutralizing the reaction mass thus obtained with sulfuric acid following which a final mass thus obtained is subjected to a recovery process for recovering 2-mercaptoethanol.
3. A process for the preparation of 2-mercaptoethanol which comprises charging sodium hydroxide, water and hydrogen sulfide into a reaction zone to produce therein sodium hydrosulfide, heating the sodium hydrosulfide thus produced to a temperature of approximately 150° F., then adding ethylene oxide and then neutralizing the final reaction mass thus obtained with sulfuric acid and recovering 2-mercaptoethanol from the neutralized final reaction mass.

References Cited in the file of this patent
FOREIGN PATENTS
769,216   France _____ Aug. 22, 1934

OTHER REFERENCES
Sjoberg. Ber. Deut. Chem. 74, 64–72 (1941).